(12) United States Patent
Svarichevsky et al.

(10) Patent No.: US 10,591,738 B2
(45) Date of Patent: Mar. 17, 2020

(54) HEADS-UP DISPLAY WITH VARIABLE FOCAL PLANE

(71) Applicant: WAYRAY AG, Zürich (CH)

(72) Inventors: Mikhail Svarichevsky, Zürich (CH); Vitaly Ponomarev, Zürich (CH)

(73) Assignee: WAYRAY AG, Zürich (CH)

( * ) Notice: Subject to any disclaimer, the term of this patent is extended or adjusted under 35 U.S.C. 154(b) by 78 days.

(21) Appl. No.: 15/588,555

(22) Filed: May 5, 2017

(65) Prior Publication Data

US 2017/0329143 A1 Nov. 16, 2017

Related U.S. Application Data

(60) Provisional application No. 62/334,898, filed on May 11, 2016.

(51) Int. Cl.
*G02B 27/01* (2006.01)
*B60K 35/00* (2006.01)
(Continued)

(52) U.S. Cl.
CPC .......... *G02B 27/0179* (2013.01); *B60K 35/00* (2013.01); *G02B 5/32* (2013.01);
(Continued)

(58) Field of Classification Search
CPC .... G02B 2027/0183; G02B 2027/0138; G02B 2027/0163; G02B 2027/0127;
(Continued)

(56) References Cited

U.S. PATENT DOCUMENTS 2,471,284 A * 5/1949 Rea .......................... H01Q 3/26
343/813
3,353,893 A * 11/1967 Bamberger ............... B60R 1/10
359/858
(Continued)

FOREIGN PATENT DOCUMENTS

| JP | 60192912 | 10/1985 |
| JP | 2009184406 | 8/2009 |
| WO | 2015029598 | 3/2015 |

OTHER PUBLICATIONS

European Patent Office (EPO); Invitation to Pay Fees-Partial Search Report PCT/IB2017/000602; dated Sep. 28, 2017; Rijswijk NL;16 Pages.
(Continued)

*Primary Examiner* — Philip P. Dang
(74) *Attorney, Agent, or Firm* — Schwabe, Williamson & Wyatt, P.C.

(57) ABSTRACT

A heads up display system with a variable focal plane includes a projection device to generate light representative of at least one virtual graphic, an imaging matrix to project the light representative of the at least one virtual graphic on at least one image plane, a display device to display the at least one virtual graphic on the at least one image plane, and a translation device to dynamically change a position of the imaging matrix relative to the display device based, at least in part, on a predetermined operational parameter to dynamically vary a focal distance between the display device and the at least one image plane.

21 Claims, 8 Drawing Sheets

(51) Int. Cl.
*G06F 3/01* (2006.01)
*G02B 5/32* (2006.01)
*G03H 1/22* (2006.01)
*G03H 1/26* (2006.01)

(52) U.S. Cl.
CPC ..... *G02B 27/0101* (2013.01); *G02B 27/0103* (2013.01); *G02B 27/0149* (2013.01); *G03H 1/2294* (2013.01); *G03H 1/26* (2013.01); *G06F 3/011* (2013.01); *G06F 3/013* (2013.01); *B60K 2370/1529* (2019.05); *B60K 2370/167* (2019.05); *B60K 2370/177* (2019.05); *B60K 2370/179* (2019.05); *B60K 2370/334* (2019.05); *G02B 2027/0127* (2013.01); *G02B 2027/0138* (2013.01); *G02B 2027/0163* (2013.01); *G02B 2027/0183* (2013.01); *G02B 2027/0185* (2013.01); *G02B 2027/0187* (2013.01); *G03H 2001/2252* (2013.01); *G03H 2210/33* (2013.01); *G03H 2225/33* (2013.01); *G03H 2225/34* (2013.01); *G03H 2226/02* (2013.01); *G03H 2227/03* (2013.01)

(58) Field of Classification Search
CPC .............. G02B 2027/0185; G02B 5/32; G02B 2027/0187; G02B 27/0149; G02B 27/0179; G02B 27/0103; G02B 27/0101; G03H 2226/02; G03H 2225/34; G03H 1/2294; G03H 1/26; G06F 3/013
See application file for complete search history.

(56) References Cited

U.S. PATENT DOCUMENTS

| | | | |
|---|---|---|---|
| 4,998,784 A | 3/1991 | Freeman | |
| 5,510,983 A | 4/1996 | Lino | |
| 5,651,047 A * | 7/1997 | Moorman | A61B 6/06 378/19 |
| 6,441,968 B1 * | 8/2002 | Okayama | G02B 15/173 359/684 |
| 7,649,545 B2 * | 1/2010 | Antonis | G01B 11/028 345/418 |
| 7,660,499 B2 * | 2/2010 | Anderson | G02B 6/0018 385/15 |
| 7,995,136 B2 * | 8/2011 | Endo | H04N 5/2352 348/296 |
| 8,690,339 B2 * | 4/2014 | Lenchenkov | G03H 1/0005 353/10 |
| 9,310,769 B2 * | 4/2016 | Smithwick | G03H 1/26 |
| 10,237,542 B2 * | 3/2019 | Hasegawa | H04N 13/398 |
| 2007/0182812 A1 * | 8/2007 | Ritchey | H04N 5/2254 348/36 |
| 2008/0291317 A1 * | 11/2008 | Endo | H04N 5/2352 348/340 |
| 2009/0005961 A1 | 1/2009 | Grabowski | |
| 2010/0002319 A1 * | 1/2010 | Maekawa | G02B 13/08 359/850 |
| 2012/0140028 A1 * | 6/2012 | Tomita | G02B 27/225 348/43 |
| 2013/0222384 A1 | 8/2013 | Futterer | |
| 2013/0278631 A1 * | 10/2013 | Border | G02B 27/017 345/633 |
| 2014/0036374 A1 | 2/2014 | Lescure | |
| 2014/0361957 A1 * | 12/2014 | Hua | G06F 3/013 345/8 |
| 2015/0312560 A1 * | 10/2015 | Deering | G02B 13/0085 345/1.3 |
| 2016/0003636 A1 | 1/2016 | Ng-Thow-Hing | |
| 2017/0020627 A1 * | 1/2017 | Tesar | A61B 90/20 |

OTHER PUBLICATIONS

European Patent Office (EPO); International Search Report PCT/IB2017/000602 and Written Opinion; dated Jan. 4, 2018; Rijswijk NL;16 Pages.

* cited by examiner

HEADS-UP DISPLAY WITH VARIABLE FOCAL PLANE

TECHNICAL FIELD

This disclosure generally relates to systems, devices, structures, and methods for displaying virtual graphics on a heads-up display.

BACKGROUND

Known heads-up display (HUD) systems used in vehicles such as cars and airplanes provide a vehicle operator with computer-generated virtual graphics that augment the operator's visual sensory perception of real-world objects viewable to the operator during vehicle operation. The HUD systems may be configured to generate virtual graphics and project the virtual graphics as images or text through the windshield so that the operator can view the information while holding their heads up and without taking their attention away from the real-world objects viewable during vehicle operation. When the distance to the real object and the perceived distance to the virtual graphic generated by HUD do not match, it may cause discomfort to the driver and might result in additional delay because the human eye will take a certain amount of time to refocus and converge for a different distance each time the driver takes a look at a different object.

On HUD systems designed for airplanes in particular, most objects of interest may be farther than 100 meters away from the airplane so it may be assumed that an airplane HUD with a fixed focal distance locked at infinity would provide satisfactory results for the airplane pilot.

For objects located distances of 100 meters or more, the human eye focuses on the object as if it was located infinitely far away because the rays of light that are reflected from the object essentially arrive at the operator as parallel light rays. Accordingly, the computer generated virtual graphics of known HUD systems for airplanes may be displayed to the operator to appear at an image plane set at infinity to match the focal plane of other objects visible to the operator.

Road vehicles, e.g., automobiles, present a different environment for HUD systems since objects visible to the operator are often much closer than these objects appear to airplane pilots (e.g., less than 100 meters). A HUD image set to infinity or some other arbitrary distance in many scenarios may force the operator to refocus between the HUD-generated virtual graphic and the associated real world object, as a result of the discrepancy between focal distances (unlike most airborne airplanes). Known HUD systems designed for road vehicles may be set with a fixed focal plane of between 7.5 meters to 20 meters to be in the middle of a typical focal range. The HUD system focal plane may be set at a time of manufacture to approximate the typical distances to objects of interest outside a vehicle.

Since road vehicles may operate in vastly different road environments, e.g., crowded highways, suburban streets, or open country roads, the focal plane selected by the HUD manufacturer may not be optimized for a particular road environment. Overlaying computer generated virtual graphics on an object associated with a different focal plane may make the virtual graphics appear out of focus to the operator, or create confusion for the operator if it is not clear which object is associated with the virtual graphics.

A need remains for improvements in HUD systems.

BRIEF DRAWINGS DESCRIPTION

DETAILED DESCRIPTION

Figure 1:
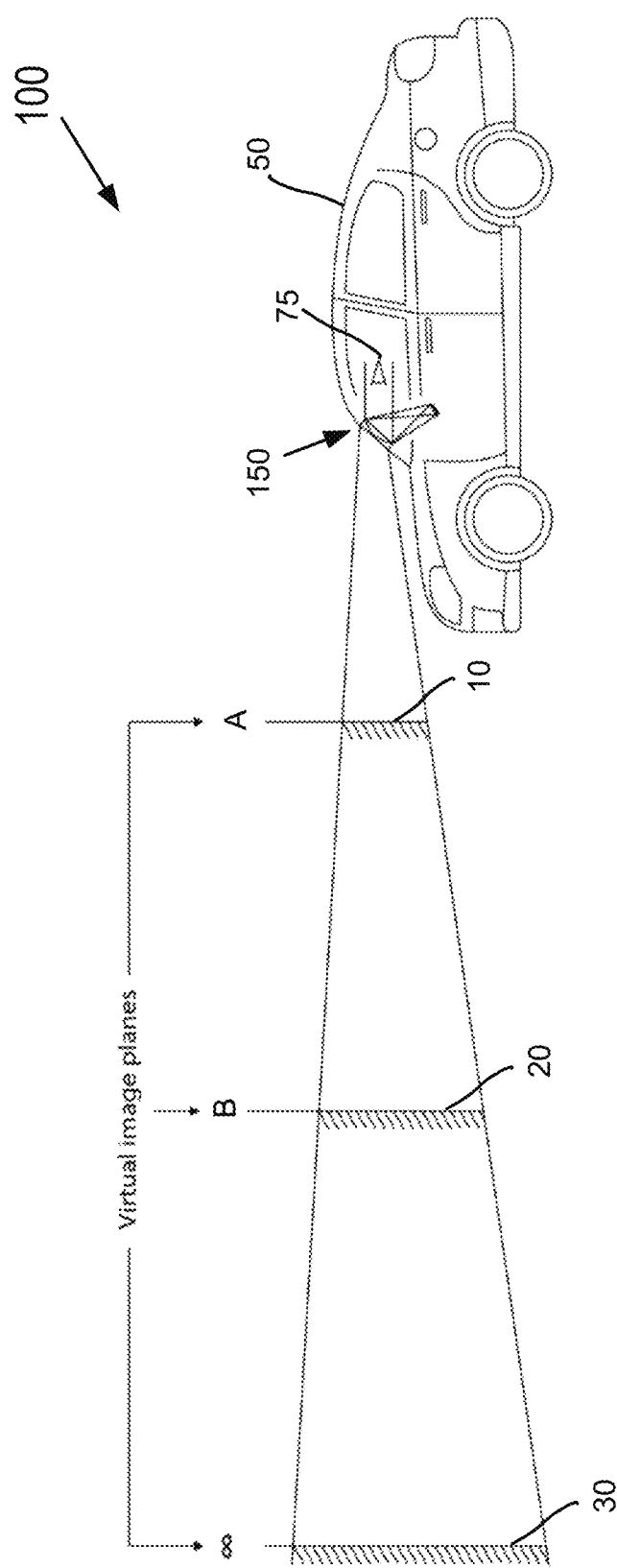
FIG. 1 illustrates an example display system for a vehicle configured with multiple image planes.

FIG. 1 illustrates an example display system 100 for a vehicle 50 configured with multiple image planes, including a first image plane 10, a second image plane 20, and a third image plane 30. In some examples, first image plane 10 may be associated with a focal distance A, second image plane 20 may be associated with a focal distance B, and third image plane 20 may be associated with a focal distance that approximates infinity.

When vehicle 50 is moving at relatively high speeds, such as on an uncongested highway at speeds above 40 mph, an image projection system 150 may be configured to display one or more computer-generated virtual graphics, e.g., images, text, or other types of imaging information, to a vehicle operator or observer 75 on third image plane 30. In some examples, third image plane 30 may approximate a predetermined distance, e.g., a distance greater than twenty meters, from vehicle 50. At relatively high speeds, operator 75 may typically be looking down the road and scanning for objects that may be located at distances of greater than the predetermined distance of twenty meters. Accordingly, display system 100 may be configured to have the focal plane associated with the computer generated virtual graphics coincide with the relatively distant objects that are being viewed by operator 75.

On the other hand, when the vehicle is moving at medium range speeds, such as when the operator 75 drives vehicle 50 on city streets or on congested highways at speeds above 20 mph but below 40 mph, display system 100 may project virtual graphics on second image plane 20 to coincide with objects that are located at focal distance B from vehicle 50.

In some examples, focal distance B associated with second image plane 20 may be less than twenty meters, e.g., approximately ten meters.

When vehicle 50 is moving at relatively slow speeds, such as when operator 75 operates vehicle 50 around a parking lot or accident scene at speeds below 20 mph, display system 100 may be configured to project virtual graphics at first image plane 10 to coincide with objects that are located at focal distance A from vehicle 50. In some examples, focal distance A associated with first image plane 10 may be less than ten meters, e.g., approximately three to five meters.

Display system 100 may be configured to project virtual images at dynamically varying image planes having dynamically varying focal distances to operator 75 according to operational parameters, including a speed of vehicle 50, location of the real-world objects, and the like. For example, as vehicle 50 starts to accelerate from a stopped position, display device 100 may be configured to sequentially vary the focal distance of the image plane that is displayed to operator 75 from first image plane 10 to second image plane 20, and from second image plane 20 to third image plane 30. In some examples, display system 100 may comprise manual controls that enable operator 75 to selectively display the virtual graphics at one or more of image planes 10, 20, 30, or the like, or at different vertical or horizontal positions on the windshield. In still other examples, display system 100 may be configured to display a first portion of computer generated virtual graphics at an image plane selected based on vehicle travel speed, and a second portion of graphics may be displayed on an auxiliary image plane selected by operator 75.

Display system 100 may be configured to project virtual graphics at dynamically varying focal distance image planes, based at least in part on, operational parameters including a distance between an actual real-world object and vehicle 50, as determined by the display system 100 or associated navigation device. For example, when vehicle 50 is turning, system 100 may track a distance to the curve and dynamically change the image planes to project virtual graphics to avoid having operator 75 refocus from the virtual graphics to the curve. In other words, system 100 dynamically changes the image plans on which it projects virtual graphics to be consistent with a changing distance between vehicle 50 and any real object.

Figure 2A:
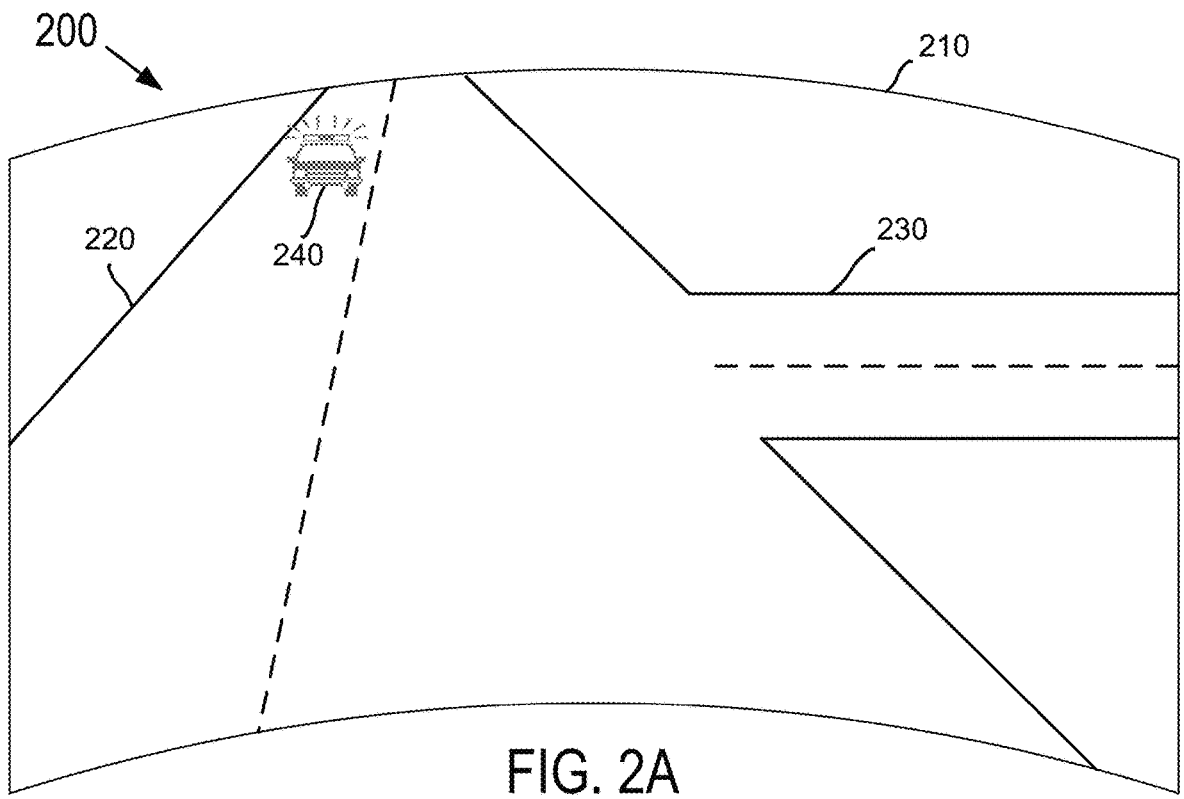
FIG. 2A illustrates an example display device associated with multiple real-world objects.
Figure 2B:
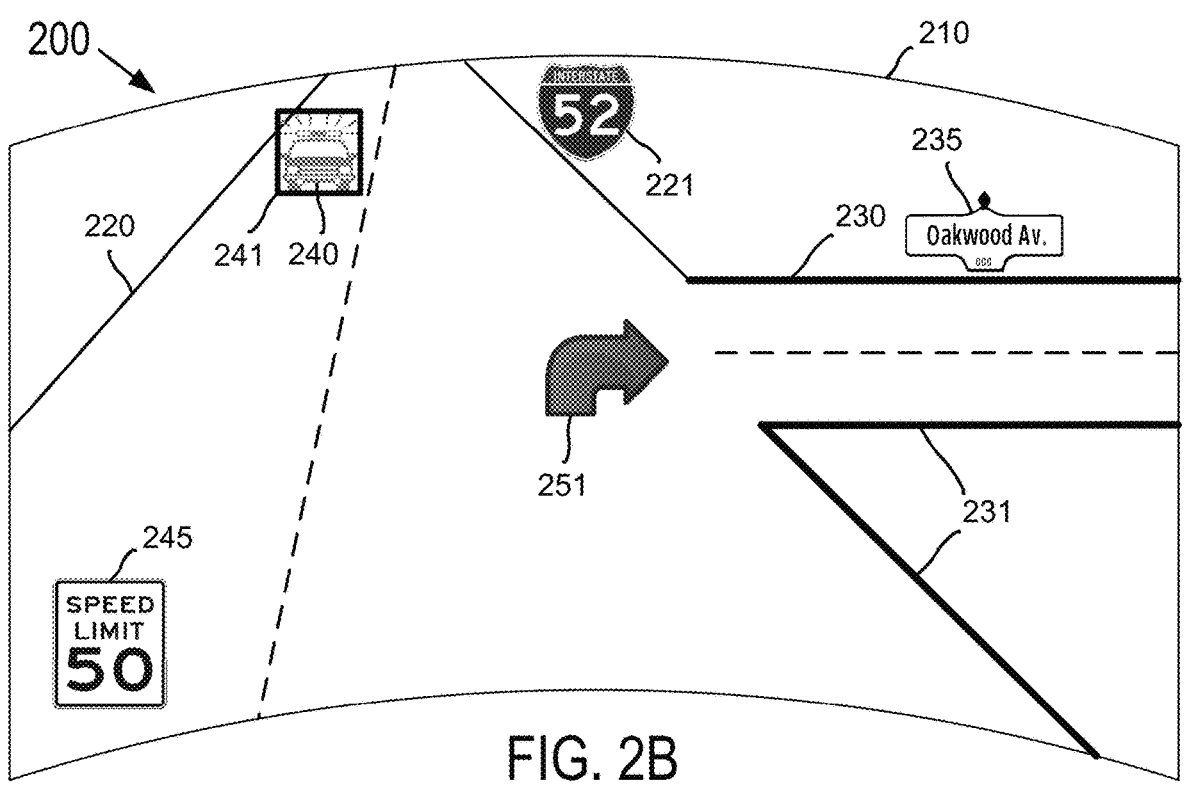
FIG. 2B illustrates an example display device show in FIG. 2A with computer generated virtual graphics displayed at a plurality of focal planes.

FIG. 2A illustrates an example display device 200 associated with real-world objects that may be visible through a windshield 210 of a vehicle 50 shown in FIG. 1. FIG. 2B illustrates an example display device 200 with computer-generated graphics displayed at a plurality of focal image planes. Referring to FIGS. 1, 2A, and 2B, in an embodiment, operator 75 may view a road 220 that vehicle 50 travels on as well as other objects through windshield 210. Road 220 may be connected to a side road 230 that vehicle 50 is approaching. Apart from road 220, operator 75 may view other objects along its path through windshield 210 including other vehicles 240. In some examples, objects viewable through windshield 210 may depict real-world objects that system 200 may or may not augment with computer-generated virtual graphics. System 200 may automatically augment the real-world objects with virtual graphics based on location, travel speed, travel direction, traffic, vehicle operational parameters, weather, and the like. System 200 may automatically augment the real-world objects with virtual graphics based on settings in vehicle 50.

System 100 may augment real-world objects visible through windshield 210 with virtual graphics projected onto windshield 210 at a plurality of focal image planes. For example, system 100 may project a highway designation 221 associated with current road 220 on third image focal plane 30. Highway designation 221 may appear located at some distant point up ahead of current road 220 to operator 75, which in some examples may approximate a focus point of infinity. System 100 may project a graphical alert 241 over incoming vehicle 240 to alert operator 75 of incoming vehicle 240's presence and proximity.

System 100 may project graphical alert 241 over or around, partially or fully, over vehicle 240. System 100 may project graphical alert 241 in any color or shape known to persons of ordinary skill in the art. Graphical alert 241 may be accompanied by an audible alert heard by operator 75 using the vehicle's on-board sound system, e.g., speakers. In some examples, system 100 may project graphical alert 241 to track the relative movement of vehicle 240 by dynamically changing the image plane it uses to project graphical alert 241. When public safety vehicle 240 is located some distance down current road 220 from vehicle 50, such as greater than twenty meters, system may project graphical alert 241 at a focal distance corresponding with third image plane 30, similar to the projection image plane used to project highway designation 221. As vehicle 240 approaches vehicle 50, system 100 changes the focal image plane it uses to project graphical alert 241 from third image plane 30 to second image plane 20 such that graphical alert 241 tracks the movement of vehicle 240.

System 100 may project on windshield 221 additional information 245 associated with vehicle 50, road 220, object visible through windshield 221, or the like. For example, system 100 may be configured to display speed limit 245 associated with current road 220 in response to identifying that vehicle 240 is a public safety vehicle or in response to identifying road 220 as a highway. System 100 may be able to determine that vehicle 240 is a public safety vehicle by detecting the presence of certain characteristics of vehicle 240, e.g., equipment, flashing lights, vehicle markings, and the like using any known system either internal or external to vehicle 50, e.g., headlight and other sensors. Additionally, system 100 may be configured to alert operator 75 if vehicle 50 is traveling faster than the posted speed limit for current road 220 by e.g., flashing additional information 245 or providing an audible alert through vehicle 50's sound system. In some examples, system 100 may be configured to display additional information 245 at any appropriate image plane, e.g., first image plane 10.

System 100 may be configured to project navigation information 251, such as a turn indicator, associated with a route 231 onto windshield 210. System 100 may project navigation information 251 on windshield 210 while audibly providing turn by turn instructions, e.g., "turn right onto Oakwood Avenue," using any audible means available, e.g., vehicle 50's sound system. System 100 may substantially simultaneously project a route name 235, overlaid or otherwise, in a same image plane as side road 230. In some examples, system 100 may be configured to display navigation information 251, route 231, and route name 235 at any same image plane, e.g., second image plane 20. In some examples, system 100 may be able to project certain virtual graphics, e.g., additional information 245, at a first image plane 10, while projecting other virtual graphics, e.g., route name 235, at second image plane 20 different from first image plane 10. In some examples, system 100 may determine the image planes at which to project virtual graphics based on operational parameters, e.g., location of real-world objects, vehicle speed, vehicle location, operator position, traffic, and the like, as explained in more detail below.

Figure 3A:
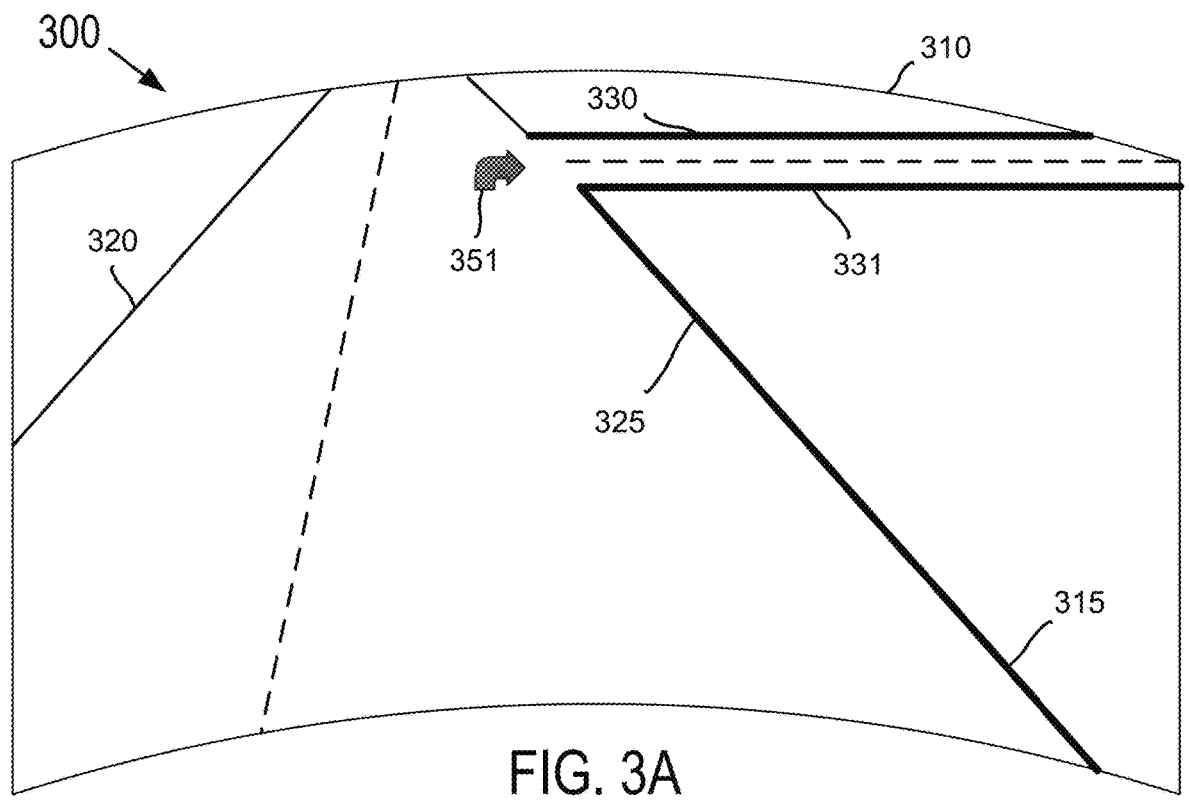
FIG. 3A illustrates an example display device with computer generated virtual graphics displayed at an inclined image plane.
Figure 3B:
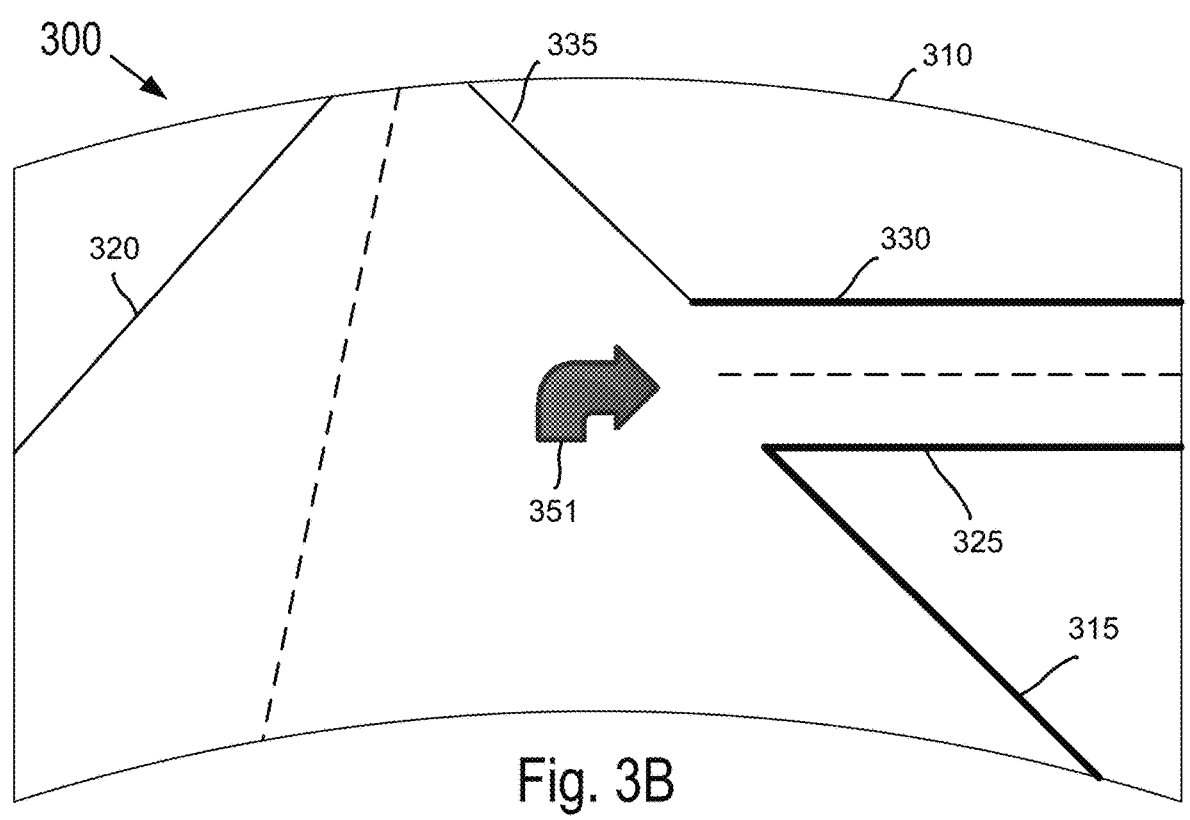
FIG. 3B illustrates an example display device with an updated image plane.

FIG. 3A illustrates an example display device 300 with computer generated virtual graphics displayed at an inclined image plane. FIG. 3B illustrates an example display device with an updated image plane associated with the computer generated virtual graphics. Referring to FIGS. 1, 3A, and 3B, system 100 may be configured to project virtual graphics on a display device 300. For example, system 100 may be configured to project, on a windshield 310, navigation information 351, such as a turn indicator, associated with a route 331. System 100 may project navigation information 351 while audibly providing turn by turn navigation instructions using any audible means available, e.g., vehicle 50's sound system. Navigation information 351 may involve turning from a current road 320 onto a side street 330. Current road 320 and side street 330 may be visible, at least in part, through windshield 310 of vehicle 50. FIG. 3A may be understood as depicting route 331 on an image plane 30 when side street 330 is located some distance down current road 320. For example, system 100 may project navigation information 351 at image plane 30 when system 100 determines that side street 330 is a predetermined distance, e.g., greater than twenty meters, from vehicle 50. System 100 may determine a distance between vehicle 50 and real world objects, e.g., side street 330, using any means known to a person of ordinary skill in the art including optical sensors, global positioning systems, and other devices (not shown) attached or otherwise coupled to vehicle 50 and explained in more detail below, e.g., when describing FIG. 9.

Display device 100 may be configured to display different portions of route 331 on a tilted or inclined image plane. For example, system 100 may project, on windshield 310, a first portion of route 331 at a first focal distance 315, a second portion of route 331 at a second focal distance 325 greater than first focal distance 315, and a third portion of route 331 at a third focal distance 335 greater than second focal distance 325. In some examples, focal distances 315, 325, and 335 associated with the graphical overlay of route 331 may continuously vary between the first portion and the third portion to provide a smooth continuum or graduation of focal distances associated with route 331, comparable with the focal distances of the real-world objects that correspond to route 331.

As vehicle 50 approaches side street 330, side street 330 may appear lower down near the middle of the windshield 310 because of the tilted or inclined image plane. System 100 may project route 331 and navigation information 351 lower down near the middle of windshield 310 from the positions shown in FIG. 3A.

In addition to tracking the location of the real-world objects relative to the horizontal and vertical two-dimensional coordinates of the windshield 310 so that virtual graphics augment or appear overlaid onto the real-world objects from the perspective of operator 75, system 100 may also be configured to track the relative distances to the real-world objects and adjust the focal points and/or image planes or the graphics that are overlaid onto the real-world objects. System 100 may detect, generate, or otherwise determine the relative distances using any known means, including the use of optical sensors, global positioning systems, and other devices (not shown) attached or otherwise coupled to vehicle 50.

System 100 may be configured to gradually decrease the focal distance of side street 330 such that it appears at a second focal distance 325, rather than at third focal distance 335. Similarly, system 100 may be configured to decrease the focal distance of the second portion of route 331 prior to side street 330 from second focal distance 325 to first focal distance 315. In some examples, by dynamically varying and/or adjusting the focal point of one or more portions of route 331, operator 75 may more readily ascertain the distance and/or location of navigation information 351 relative to route 330.

Figure 4:
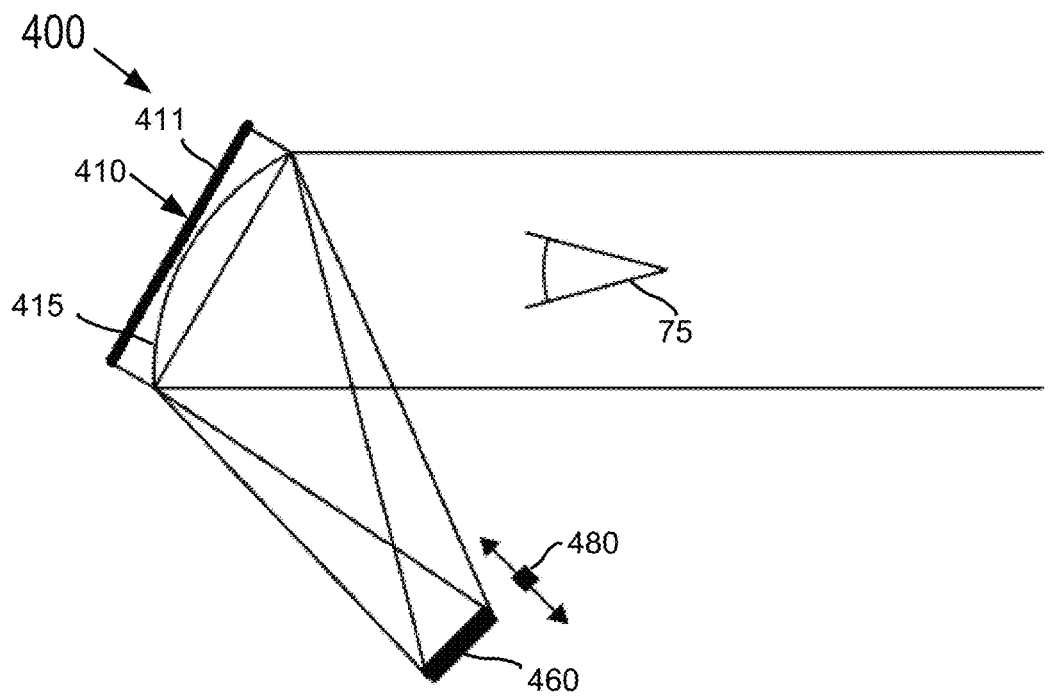
FIG. 4 illustrates a simplified graphical depiction of an example projection system configured to display virtual graphics at a plurality of focal image planes.

FIG. 4 illustrates a simplified graphical depiction of an example projection system 400, such as system 100 shown in FIG. 1, configured to project or display virtual graphics at a plurality of focal image planes. Referring to FIGS. 1 and 4, projection system 400 may comprise a transparent holographic film 411 affixed on a windshield 410. Holographic film 411 may be embedded or otherwise affixed to windshield 410. Holographic film 411 may be alternatively placed on a display device (not shown separately from system 400) placed between operator 75 and windshield 410. In some examples, holographic film 411 may comprise a plurality of collimators 415 embedded in the film 411 for collimating and/or combining light emitted from an imaging matrix 460 with the images of the real-world objects passing through the film 411 towards operator 75.

In an example embodiment, projection system 400 may comprise a translation device 480 configured to move the relative position of the imaging matrix 460 and/or imaging plane, so that operator 75 may view computer generated virtual graphics at dynamically changing image focal planes and/or focal positions based, at least in part, on a position of operator 75. Translation device 480 may dynamically move imaging matrix 460 in a horizontal or vertical direction, as well as change the incline angle of imaging matrix 460 based, at least in part, on operational parameters or vehicle settings. Translation device 480 may comprise an electric motor, such as a linear motor, a DC motor, a brushless motor, a stepper motor, or an ultrasonic piezo motor with optional position feedback. In still other examples, translation device 480 may comprise a screw-type motor, a servo-motor, a mechanical gear, a magnetic switch, a position sensor, other types of positional devices or electric motors, or any combination thereof.

Physically moving imaging matrix 460 inside projection system 400 closer to collimator 415 may result in moving a focal plane of a projected virtual graphic further away from operator 75, until the focal plane reaches infinity. Conversely, moving imaging matrix 460 inside projection system 400 farther from collimator 415 may result in moving a focal plane of a projected virtual graphic closer to operator 75. In some examples, imaging matrix 460 may comprise a liquid crystal display (LCD), a digital micro-mirror device (DMD), a microelectromechanical (MEMS) laser scanner, a liquid crystal on silicon (LCoS) matrix, a matte glass with a projected image, other types of imaging matrices, or any combination thereof.

Figure 5:
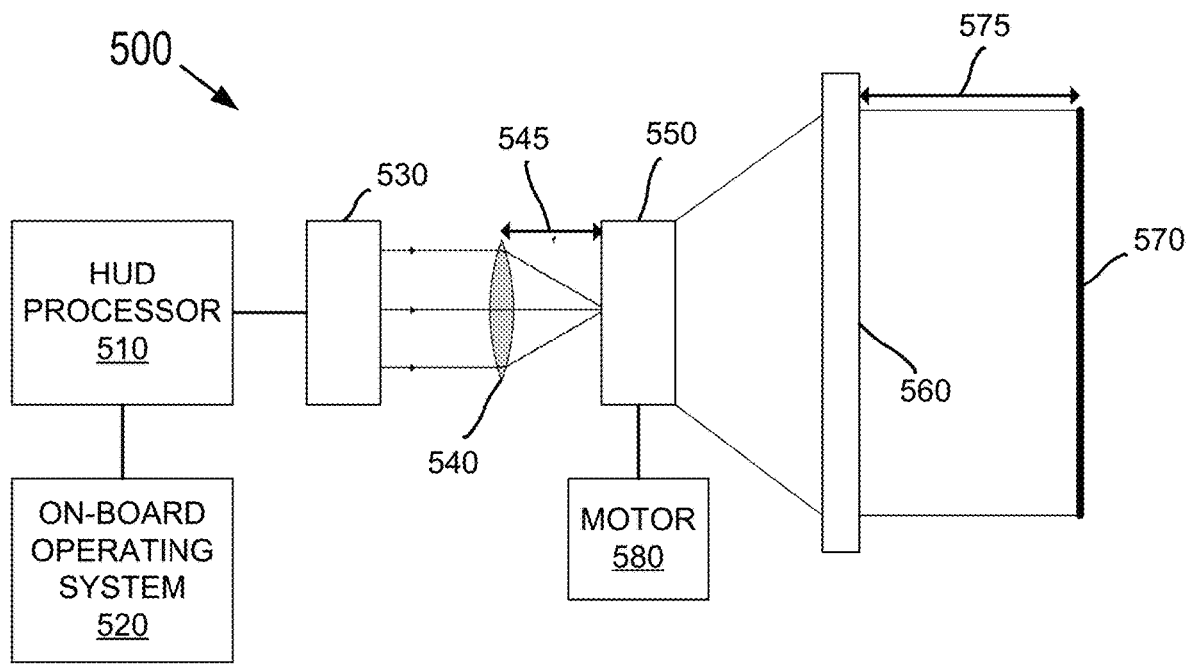
FIG. 5 illustrates an example display system configured to interface with an on-board vehicle operating system.

FIG. 5 illustrates an example display system 500 configured to interface with an on-board operating system 520. Referring to FIGS. 1 and 5, on-board operating system 520 may comprise one or more vehicle processors or on-board computers, memory of any known type, and instructions stored in the memory, that may interface with a HUD processor 510. In an example embodiment, display system 500 may be configured to connect to the on-board operating system 520 via the on-board diagnostic (OBD) port of vehicle 50 as is well known to persons of ordinary skill in the art. HUD processor 510 may be configured to control or otherwise operate a projection device 530 that, in turn, may be configured to generate and/or project light representative of at least one virtual image onto an imaging matrix 550. HUD processor 510 may determine virtual graphics to display on display device 560 based on operational parameters and provide indication of the virtual graphic to projection device 530 that, in turn, may project light representative of the virtual graphic to the imaging matrix 550. In some examples, one or more optical devices 540 or lenses may be configured to correct aberrations, filter, and/or to improve light utilization efficiencies. Optical devices 540 may include any type of optical device, e.g., filters, known to persons of ordinary skill in the art.

Imaging matrix 550, in turn, may be configured to selectively distribute and/or propagate the virtual image received as light from projection device 530 or optical devices 540 as one or more wave fronts to a display device 560. In some examples, display device 560 may comprise a vehicle windshield, e.g., windshield 410 shown in FIG. 4, holographic film placed adjacent windshield, e.g., holographic film 411 shown in FIG. 4, or a combination thereof.

In some examples, imaging matrix 550 may comprise a holographic phase-amplitude modulator configured to simulate an arbitrary wave front of light. In an example embodiment, imaging matrix 550 may simulate a wave front for each of multiple image planes, each wave front representing a virtual image. Imaging matrix 550 may be configured to implement an arbitrary number of virtual image planes with information displayed on them simultaneously and arbitrarily.

Imaging matrix 550 may comprise a high-resolution phase modulator, such as a full high-definition modulator having any resolution known to a person of ordinary skill in the art, e.g., 4000 or higher pixel resolution. Imaging matrix 550 may be illuminated by coherent light received from projection device 530 or optical devices 540 with a predefined beam divergence. Imaging matrix 550 may produce a digital hologram on the modulator and may project a wave front representative of the hologram onto a display device 560 on multiple simultaneous virtual image planes 570.

Display system 500 may be configured to generate one or more virtual graphics, e.g., images, text, or any other graphical information known to a person of ordinary skill in the art, on image plane 570. In some examples, image plane 570 may be associated with a focal distance 575. Although image plane 570 is illustrated as being located on an opposite side of display device 560 from imaging matrix 550, in some example embodiments, display device 500 may be configured to reflect light associated with the wave front propagated by imaging matrix 550 so that the resulting image is reflected back to operator 75. While the image may be reflected back from display device 560 to operator 75, the image plane may nevertheless appear to the operator to be located on the opposite side of the display device 560 (e.g., on the same side of the display device as the real-world objects, outside of the vehicle).

Figure 9:
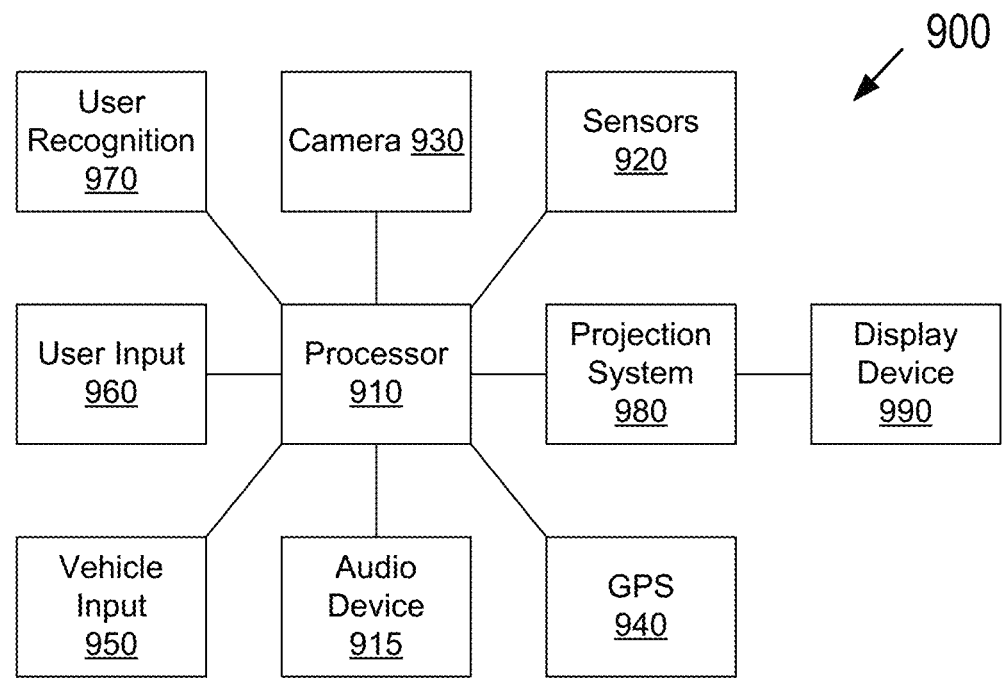
FIG. 9 illustrates a block diagram of an example display system.

Additionally, display system 500 may comprise a translation device or motor 580 configured to dynamically vary the focal distance 575 associated with image plane 570. In some examples, motor 580 may be configured to move imaging matrix 550 relative to display device 560 in any direction, e.g., vertical or horizontal, as well as change the incline angle of imaging device 550. In other examples, motor 580 may be configured to move one or more optical devices 540 relative to imaging matrix 550. Still further, motor 580 may be configured to vary a focal distance 545 between the one or more optical devices 540 and imaging matrix 550. Motor 580 may dynamically vary the focal distance 575 by moving imaging matrix 550 relative to display device 560 or relative to optical devices 540 or by moving optical devices 540 relative to imaging matrix 550. In an example embodiment, motor 580 may dynamically vary the focal distance 575 based, at least in part, on a predetermined operational parameters including vehicle parameters, e.g., speed, location, travel direction, destination, windshield location, traffic, and the like, road parameters, e.g., location or presence of real world objects, roads, and the like, vehicle operator parameters, e.g., operator location within vehicle, operator's eye location and tracking, operator parameters, e.g., eye tracking, eye location, position of system, and the like, or a combination thereof. Operational parameters may further include any input received from any of a plurality of sources including vehicle systems or settings, e.g., user recognition system 970, camera 930, sensors 920, user input 960, vehicle input 950, audio device 915, GPS 940, or a combination thereof as shown in FIG. 9.

In addition to varying the focal distance 575 of image plane 570, motor 580 may be configured to adjust the relative distance of image plane to operator 75. In an example embodiment, display system 500 may be configured to be compatible with a number of different types of vehicles which may be associated with different operator positions, including height of the operator's eyes or distance from the operator to windshield, e.g., windshield 410 shown in FIG. 4.

Figure 6:
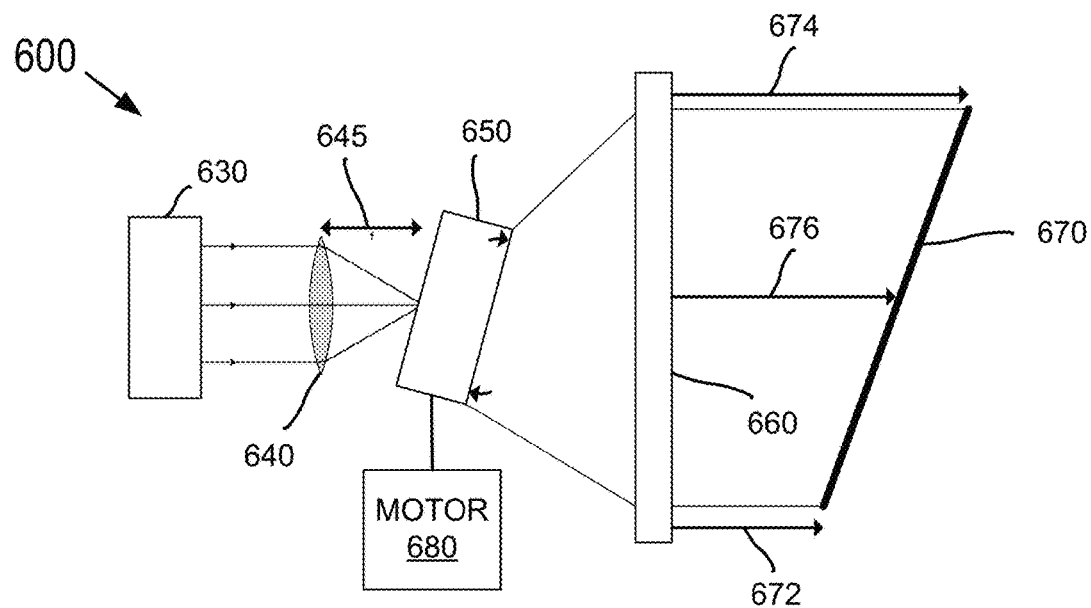
FIG. 6 illustrates an example display system configured to generate virtual graphics at an inclined image plane.

FIG. 6 illustrates an example display system 600 configured to generate virtual graphics at an inclined image plane 670. Display system 600 may comprise a projection device 630 configured to project light onto an imaging matrix 650 which may, in turn, be configured to selectively distribute and/or propagate the light as one or more wave fronts to a display device 660, similar to that described for the display system 500 shown in FIG. 5.

A motor 680 associated with display system 600 may be configured to dynamically vary an angle of incline of imaging matrix 650 to affect the angle of inclined image plane 670 based, at least in part, on operational parameters including vehicle parameters, e.g., speed, location, travel direction, destination, windshield location, and the like, road parameters, e.g., location or presence of real world objects, roads, and the like, vehicle operator parameters, e.g., operator location within vehicle, operator's eye location and tracking, or operator parameters, e.g., eye location, eye tracking, head position, and the like, or a combination thereof.

For example, by tilting imaging matrix 650, a lower portion of inclined image plane 670 may be associated with a first focal distance 672, and an upper portion of inclined image plane 670 may be associated with a second focal distance 674, greater than first focal distance 672. Additionally, a central portion of inclined image plane 670 may be associated with an intermediate focal distance 676 between first focal distance 672 and second focal distance 674, e.g., a focal distance equal to an average distance of first and second focal distances 672 and 674, respectively. In some example embodiments, in addition to varying an angle of inclined image plane, motor 680 may be configured to adjust the relative distance of image plane to operator 75 on a substantially horizontal axis. For example, display system 600 may be configured to be compatible with a number of different types of vehicles which may be associated with different operator positions, including height of an operator 75's eyes or a distance from operator 75 to a windshield, e.g., windshield 410 shown in FIG. 4.

In some example embodiments, in addition to varying an angle of incline of imaging matrix 650, motor 680 may be configured to linearly displace imaging matrix 650 and/or optical device 640 by a distance 645 to translate inclined image plane 670 closer to or further from display device 660.

Figure 7:
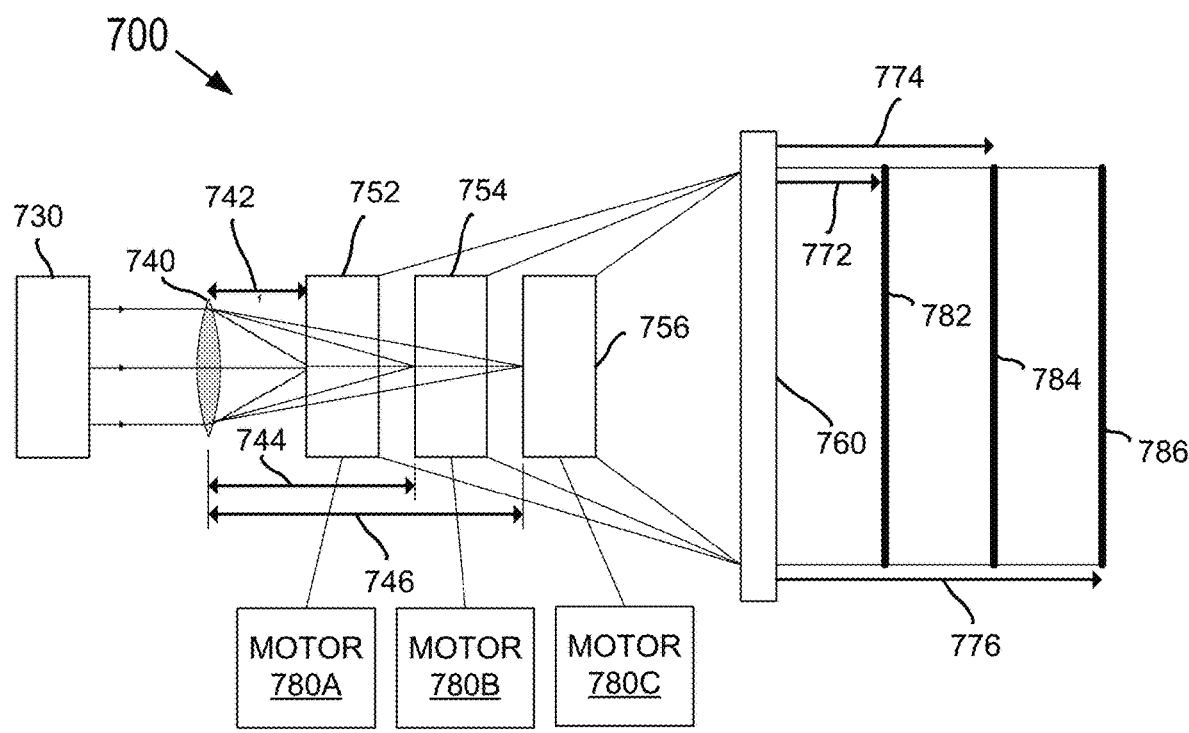
FIG. 7 illustrates an example display system comprising a plurality of stacked imaging matrices.

FIG. 7 illustrates an example display system 700 comprising a plurality of stacked imaging matrices, including a first imaging matrix 752, a second imaging matrix 754, and a third imaging matrix 756. In some examples, some or all of the stacked matrices may comprise a transparent imaging matrix, which may be physically placed at different distances from a display device 760. In some examples, the stacked imaging matrices may be configured to display information at different distances from the display device 760 at substantially a same time. Each image plane inside display system 700 may be configured to form a virtual image plane at different distances from display device 760 and, therefore, at difference distances from operator 75. By doing so, virtual graphics may be displayed at different focal distances or image planes to operator 75 to thereby augment real world objects at dynamically varying focal image planes.

For example, first imaging matrix 752 may be configured to generate one or more virtual graphics, e.g., images or text, at a first image plane 782 located at a first focal distance 772, and second imaging matrix 754 may be configured to generate one or more virtual graphics, e.g., images or text, at a second image plane 784 located at a second focal distance 774. Additionally, third imaging matrix 756 may be configured to generate one or more virtual graphics, e.g., images and/or text, at a third image plane 786 located at a third focal distance 776. In some examples, first focal distance 772 may be approximately three to five meters, second focal distance 774 may be approximately ten to twenty meters, and third focal distance 776 may be approximately set at infinity. A person of ordinary skill in the art will understand that focal image planes 782, 784, and 786 may be set at any focus distance depending on operational parameters or other characteristics.

Display system 700 may be configured to direct light from a projection device 730 onto each of the imaging matrices 752, 754, and/or 756. In some examples, one or more optical devices 740 may be configured to direct the light onto each of the matrices 752, 754, and/or 756. A first focal point 742 may be associated with a first imaging device 752. A second focal point 744 may be associated with a second imaging device 754. And a third focal point 746 may be associated with third imaging device 756. In an example embodiment, each of the imaging devices 752, 754, and 756 may be associated with a corresponding translation device 780A, 780B, or 780C, respectively, to vary the focal distance, e.g., first focal point 742, second focal point 744, and third focal point 746. Additionally, an angle of incline of one or more of the image planes 782, 784, or 786 may be varied by varying an angle of incline of the imagining matrices 752, 754, or 756 by one or more translation devices or motors 780A, 780B, or 780C. Persons of ordinary skill in the art should recognize that a single motor 780 may be used to change the incline angle of imaging matrices 752, 754, and 756. Alternatively, each imaging matrix 752, 754, or 756 may be operatively coupled to an individual translation device or motor 780A, 780B, or 780C, respectively. Persons of ordinary skill in the art should recognize that motors 780A, 780B, or 780C may have a similar construction to motor 680 shown in FIG. 6 or motor 580 shown in FIG. 5.

Figure 8:
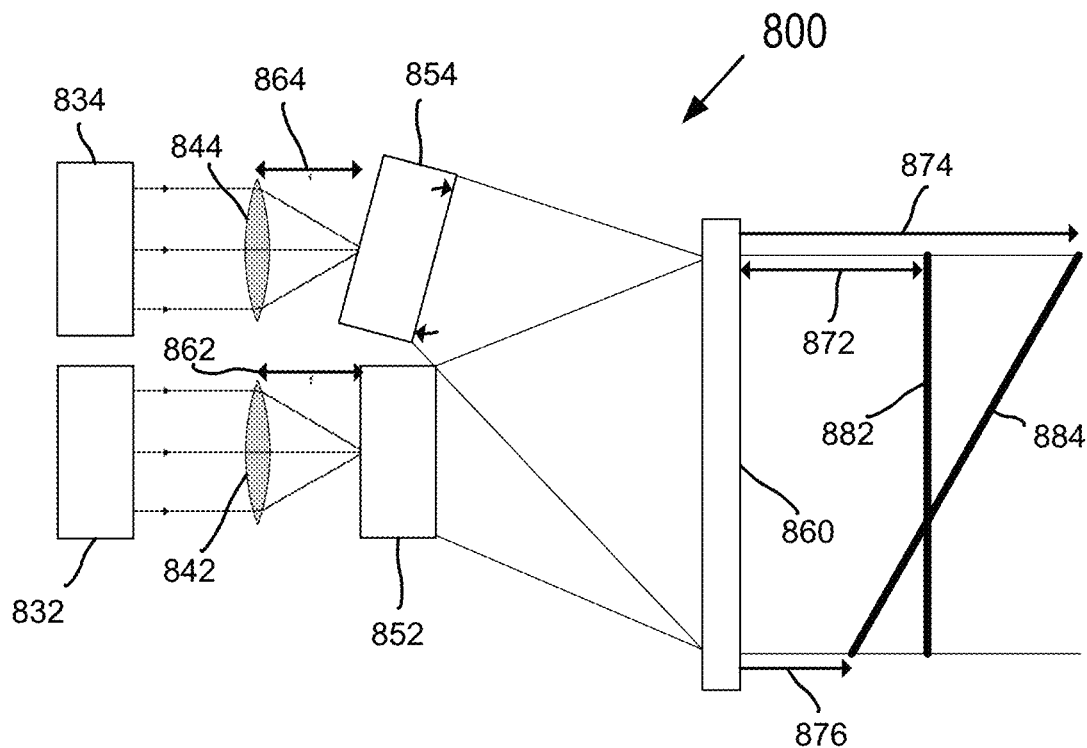
FIG. 8 illustrates an examples display system comprising a plurality of imaging matrices.

FIG. 8 illustrates an example display system 800 comprising a plurality of imaging matrices, including a first imaging matrix 852 and a second imaging matrix 854. Referring to FIGS. 1 and 8, in some examples, each of the imaging matrices 852 and 854 may be associated with a projection device, such as a first projection device 832 and a second projection device 834, and one or more optical devices, such as a first optical device 842 and a second optical device 844. First optical device 842 may have a focal distance 862 from first imagining matrix 852 while second optical device 844 may have a second focal distance 864 from second imaging matrix 854.

The multiple imaging matrices or projection devices 852 and 854 may be configured to display different images for operator 75's right and left eyes to thereby together form a stereo image that is displayed on display device 860 at image planes 882 and 884. In an example embodiment, a camera 930 (FIG. 9) may be used to track a position of each of operator 75's right and left eyes. Images displayed by one or both of first imaging matrix 852 and second imaging matrix 854 may be adjusted according to the specific operator 75's right and left eye positions.

First imaging matrix 852 or second imaging matrix 854 may be configured similarly to imaging matrix 550 shown in FIG. 5, imaging matrix 650 shown in FIG. 6, imagining matrix 752, 754, or 756 shown in FIG. 7, or imaging matrix 850 shown in FIG. 8. In some examples, second imaging matrix 854 may be laterally offset from first imaging matrix 852 or vice versa. Additionally, second imaging matrix 854 may be inclined relative to a display device 860, towards which first imaging matrix 852 and second imaging matrix 854 may be configured to propagate one or more wave fronts.

First imaging matrix 852 may be configured to project light representative of virtual graphics, e.g., one or more images and/or text, at a first image plane 882. In some examples, first image plane 882 may generally be associated with a focal distance 872, such that each virtual graphic generated by first imaging matrix 852 may be understood to be located at approximately the same focal distance 872.

Additionally, second imaging matrix 854 may be configured to project light representative of virtual graphics, e.g., one or more images and/or text, at a second image plane 884. In some examples, second image plane 884 may comprise an inclined image plane corresponding to one or more focal distances, such as a first focal distance 874 and a second focal distance 876. A first virtual graphic generated by second imaging matrix 854 may be understood to be located at approximately first focal distance 874 and a second virtual graphic generated by second imaging matrix 854 may be understood to be located at approximately second focal distance 876. In some examples, second image plane 884 may be associated with a continuum of focal points which incrementally and/or continuously vary between first focal distance 874 and second focal distance 876.

A first class of virtual graphics may be associated with first image plane 882 and a second class of virtual graphics may be associated with second image plane 884. For example, virtual graphics, e.g., images and/or text, associated with the vehicle such as vehicle speed or the time of day may be displayed on first image plane 882. Virtual graphics, e.g., images and/or text, associated with vehicle navigation may be displayed on second image plane 884.

FIG. 9 illustrates a simplified block diagram of an example display system 900. System 900 may comprise a processing device 910, e.g., one or more processing devices, a system-on-a-chip (SoC) processor, one or more central processing units (CPUs), or the like. In some examples, processing device 910 may comprise an advanced risk machine (ARM), a microprocessor without interlocked pipeline stages (MIPS), a 32-bit processor, a 64-bit processor, any other type of processing device known to persons of ordinary skill in the art, or any combination thereof.

Processing device 910 may be configured to perform substantially all of the calculations associated with the preparation and/or generation of virtual graphics and/or other types of information that are to be projected by a projection system 980 and/or displayed on a display device 990, in real time. Additionally, processing device 910 may be configured to gather information from sensors 920, process a video feed from a camera 930, obtain user input 960, and obtain vehicle input 950 substantially in real time. Some or all of the input may be received and/or transmitted over a WiFi module, a Bluetooth module, any other types of communication modules known to persons of ordinary skill in the art, or any combination thereof.

Sensors 920 may comprise an inertial sensor, a digital barometer, a light intensity meter, a camera, a temperature sensor, any other type of sensors known to persons of ordinary skill in the art, or any combination thereof. In some examples, sensors 920 may be used to corroborate and/or refine information provided by a global navigation satellite system (GNSS) 940, such as a Global Position Sensor (GPS), GLONASS, GALILEO, BeiDou, any other types of navigational or position detection systems known to persons of ordinary skill in the art, or any combination thereof. For example, a barometer may be used in conjunction with the GNSS 940 to more accurately determine the relative altitude of the vehicle, and therefore also determine the position of the vehicle relative to a mapped coordinate system.

Similarly, input from camera 930 may be used in conjunction with the GNSS 940 to more accurately determine the relative distance between the vehicle and particular feature or landmark associated with the mapped coordinate system, such as a turn or a destination. Camera 930 may comprise a digital camera, a LIDAR camera, an infrared camera, a thermal camera, other types of cameras, or any combination thereof. GNSS 940 may comprise a global system for mobile communications (GSM). In examples in which the vehicle may have its own GNSS or positional system, processing device 910 may be configured to obtain positional information directly from vehicle input 950.

Input from camera 930 may be used to measure the relative movement of an object/image and to calculate the vehicle movement speed and turn speed to improve the precision of the position sensor. Similarly, input from an inertial sensor 920 may be used in the calculation and/or determination of vehicle speed, turn speed, and position of the vehicle.

Additionally, processing device 910 may be configured to receive audio input, or to output audio, over an audio device 915. For example, processing device 910 may be configured to provide audible instructions to accompany the displayed navigational route information or to provide audible alerts.

User input 960 may comprise voice commands, control input (such as buttons or knobs), an interface with a smartphone, or any combination thereof. Additionally, processing device 910 may be configured to locate and/or identify the vehicle operator by a user recognition device 970. User recognition device 970 may comprise a camera or tracking device configured to identify the operator and/or to locate the operator's relative position and/or height relative to display device 990. Based on information received from user input 960 and/or user recognition device 970, processing device 910 may be configured to initialize, customize, adjust, calibrate, or otherwise modify the functionality of system 900 to accommodate a particular user.

Processing device 910 may include any type of memory device known to a person of ordinary skill in the art. Processing device 910 may execute instructions stored in the memory device to generate virtual graphics based, at least in part, on any number of parameters, including user input 960, vehicle input 950, user recognition 970, sensors 920, audio device 915, GNSS 940, or the like, or any combination thereof.

Figure 10:
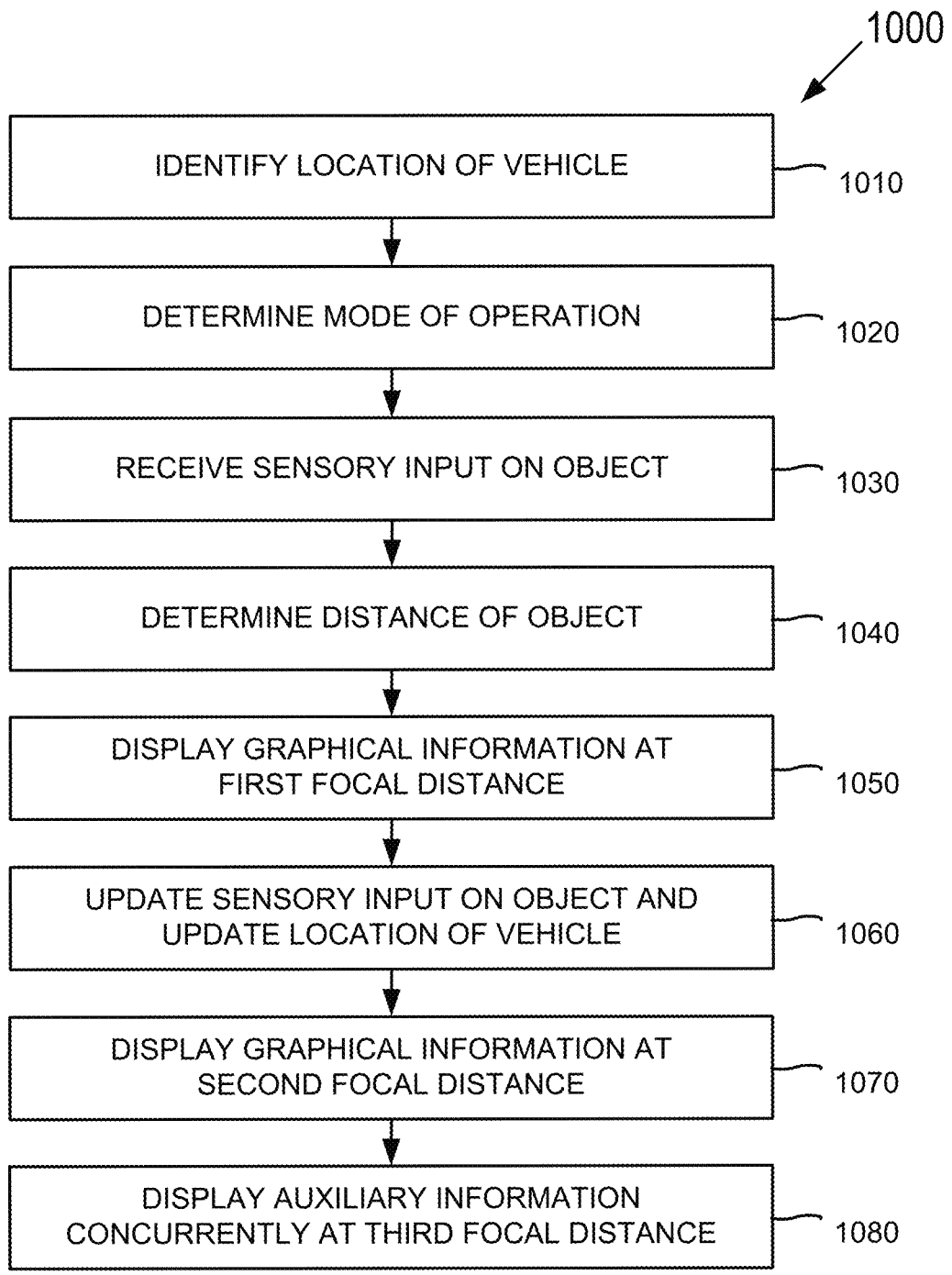
FIG. 10 illustrates an example process for displaying computer generated virtual graphics.

FIG. 10 illustrates an example process 1000 for displaying computer generated virtual graphics. At operation 1010, a display system may identify the location of an operator's vehicle. For example, the operator's vehicle may be equipped with a GNSS system.

At operation 1020, the display system may determine a mode of operation based on operational parameters or vehicle settings. For example, the display system may identify that the operator has requested navigation instructions, such as directions to a destination. In other examples, the display system may automatically identify a driving mode or a parking mode, in response to detecting movement of the vehicle.

At operation 1030, the display system may receive sensory input on one or more real-world objects located outside of the operator's vehicle. The objects may include a geographic landmark such as building, a road, a bridge, a sign, another vehicle, a pedestrian, an animal, other types of objects, or any combination thereof.

At operation 1040, the display system may determine a distance to the object. The distance to the object may be based, at least in part, on the sensory input received at operation 1030 and/or the location of the vehicle as identified at operation 1010. In some examples, the sensor input may be used to augment and/or refine the location of the vehicle relative to the object.

At operation 1050, display system may display graphical information associated with the object at a first focal distance. The first focal distance may match or correspond approximately to the distance to the object that was determined at operation 1040.

At operation 1060, the display system may update one or both of the sensory input received at operation 1030 and the location of the vehicle as identified at operation 1010. In some examples, both the object and the vehicle may be moving at the same time. In other examples, only one or the other of the object and the vehicle may be moving at any one time. Accordingly, the updated sensory input and/or vehicle location may be used to update the relative distance between the vehicle and the object.

At operation 1070, the display system may display updated graphical information at a second focal distance. In some examples, the second focal distance may correspond to or match the updated distance between the vehicle and the object as determined from operation 1060. The display system may be configured to update the focal distance and display the updated graphical information in real time. In some examples, one or more graphics may be displayed at the second focal distance while one or more other graphics are displayed at the first focal distance. In still other examples, a portion of an object may be concurrently displayed at the second focal distance while another portion of the object is displayed at the first focal distance.

At operation 1080, the display system may display auxiliary information at a third focal distance. The auxiliary information may include vehicle travel speed, vehicle location, temperature, time, other types of information, or any combination thereof. In some examples, the auxiliary information may be statically displayed at the third focal distance while the focal distance for a graphic associated with an object located outside of the vehicle may be dynamically varied over time.

Figure 11:
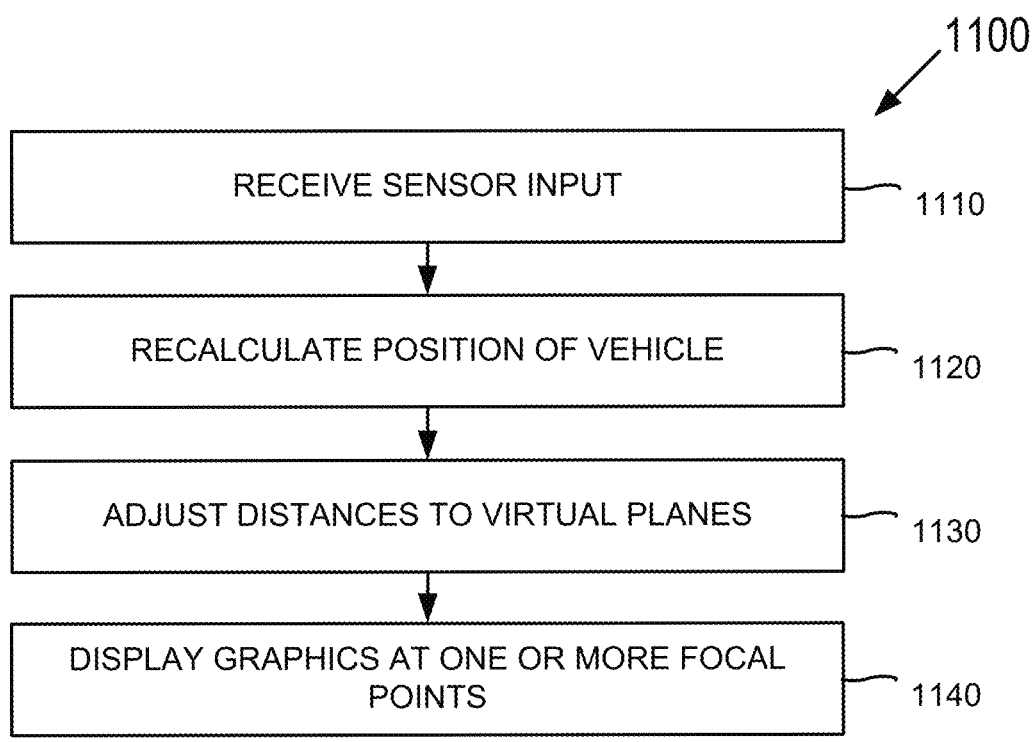
FIG. 11 illustrates an example process for displaying computer generated virtual graphics.

FIG. 11 illustrates an example process 1100 for displaying computer generated graphics. At operation 1110, input may be received from one or more sensors such as a GNSS, an inertial sensor, a camera, a barometric sensor, a light intensity meter, a temperature sensor, other types of sensors, or any combination thereof.

At operation 1120, the position of a vehicle may be calculated and/or recalculated based, at least in part, on the input from the one or more sensors.

At operation 1130, the distances to one or more virtual planes may be determined and/or adjusted based on information associated with the vehicle environment. The vehicle environment may be monitored by the one or more sensors to determine, for example, the location of one or more actual objects in proximity to the vehicle.

At operation 1140, graphical information and/or graphical images may be displayed at one or more focal distances corresponding to the vehicle environment and distances to the actual objects.

References to a vehicle in this application are not intended to be limited to an automobile, and in some examples, one or more of the example display systems disclosed herein may be configured for use in a bus, a truck, a motorcycle, a boat, an airplane, a train, a spacecraft, or other types of vehicles. Additionally, whereas some of the examples provided refer to the implementation of display systems for a vehicle, the display systems may also be configured for use in other types of devices, system, or usage applications, including a head-mounted HUD, a motorcycle helmet, a virtual reality device, a home entertainment system, gaming system, and other types of systems.

In instances where the user may be wearing a head-mounted HUD, specialized glasses, or other types of wearables, one or more virtual images provided to the user may be superimposed or otherwise combined with the images of actual objects in order to augment or enhance the user's perception of the environment, similar to the example display devices described herein as being used with a vehicle windshield.

Having described and illustrated various examples herein, it should be apparent that other examples may be modified in arrangement and detail.

The invention claimed is:

1. A system, comprising:
a projection device arranged to generate a light representative of at least one virtual graphic;
an imaging matrix arranged to modulate the light representative of the at least one virtual graphic to be projected on at least one image plane;
a display device arranged to display the at least one virtual graphic from the modulated light on the at least one image plane; and
a translation device arranged to dynamically change a position of the imaging matrix relative to the display device based at least in part on a predetermined operational parameter, wherein, to dynamically change the position of the imaging matrix, the translation device is arranged to:
dynamically vary a focal distance between the display device and the at least one image plane, wherein a lower portion of the at least one image plane is associated with a first focal distance, and an upper portion of the at least one image plane is associated with a second focal distance different from the first focal distance,
dynamically vary an angle of incline of the imaging matrix based at least in part on the operational parameter.

2. The system of claim 1, further comprising:
a processing device arranged to control the projection device, the imaging matrix, the display device, the translation device, or a combination thereof.

3. The system of claim 2, further comprising:
an optical device arranged to filter the light generated by the projection device.

4. The system of claim 3, wherein the optical device is positioned between the projection device and the imaging matrix.

5. The system of claim 1, wherein the display device comprises a holographic film.

6. The system of claim 5, wherein the holographic film comprises a plurality of collimators.

7. The system of claim 1, wherein the imaging matrix comprises a holographic phase-amplitude modulator arranged to generate at least one wave front representative of the at least one virtual graphic.

8. The system of claim 1, wherein:
the translation device comprises a motor, and wherein the motor comprises an electric motor, a linear motor, a DC motor, a brushless motor, a stepper motor, an ultrasonic piezo motor, a screw-type motor, a servo-motor, a mechanical gear, a magnetic switch, or a position sensor, or any combination thereof, and
the imaging matrix is a micro-mirror device, a liquid crystal on silicon (LCoS) matrix spatial light modulator, a matte glass, or any combination thereof, wherein the micro-mirror device is one or more of a micro-mirror actuator, a digital micro-mirror device (DMD), or a microelectromechanical (MEMS) scanner.

9. The system of claim 1, wherein the operational parameters include vehicle parameters, road parameters, or vehicle operator parameters, operator parameters, or a combination thereof.

10. The system of claim 1, wherein the translation device is arranged to adjust the imaging matrix in a substantially horizontal axis to vary a horizontal position of the at least one image plane.

11. A heads up display system, comprising:
a projection device arranged to generate a light representative for each of a plurality of virtual graphics;
a plurality of imaging matrices, wherein individual imaging matrices of the plurality of imaging matrices are arranged to modulate respective light representative of individual virtual graphics of the plurality of virtual graphics on a corresponding one of a plurality of image planes;
a display device arranged to display each of the plurality of virtual graphics of the modulated light on the corresponding one of the plurality of image planes; and
a plurality of translation devices corresponding to the plurality of imaging matrices, wherein individual translation devices of the plurality of translation devices are arranged to dynamically change a position of the individual imaging matrices relative to the display device based at least in part on a predetermined operational parameter, wherein, to dynamically change the position of the individual imaging matrices, the individual translation devices are arranged to:

dynamically vary respective focal distances between the display device and the corresponding one of the plurality of image planes, wherein a lower portion of the corresponding one of the plurality of image planes is associated with a first focal distance, and an upper portion of the corresponding one of the plurality of image planes is associated with a second focal distance different from the first focal distance, and dynamically vary an angle of incline of the individual imaging matrices based at least in part on the operational parameter.

12. The heads up display system of claim 11, further comprising:

a processing device arranged to control one or more of the projection device, the plurality of imaging matrices, the display device, and the plurality of translation devices.

13. The heads up display system of claim 11, further comprising:

at least one optical device arranged to filter the light generated by the projection device, wherein the optical device is positioned between the projection device and the plurality of imaging matrices.

14. The heads up display system of claim 11, wherein each of the plurality of imaging matrices comprises a holographic phase-amplitude modulator arranged to generate at least one wave front representative of at least one of the plurality of virtual graphics.

15. The heads up display system of claim 11, wherein each of the plurality of translation devices comprises a motor, and wherein the motor comprises an electric motor, a linear motor, a DC motor, a brushless motor, a stepper motor, an ultrasonic piezo motor, a screw-type motor, a servo-motor, a mechanical gear, a magnetic switch, or a position sensor, or any combination thereof.

16. The heads up display system of claim 11, wherein the operational parameters include vehicle parameters, road parameters, or vehicle operator parameters, operator parameters, or a combination thereof.

17. The heads up display system of claim 11, wherein at least one of the plurality of translation devices is arranged to dynamically vary an angle of incline of at least one of the plurality of imaging matrices based at least in part on the operational parameters.

18. The heads up display system of claim 11, wherein a first imaging matrix is arranged to adjust projection of a light representative of a first virtual graphic of the plurality of virtual graphics on a first image plane according to a left eye position of an operator; and wherein a second imaging matrix is arranged to adjust projection of a light representative of a second virtual graphic of the plurality of virtual graphics on a second image plane according to a right eye position of the operator.

19. The heads up display system of claim 18, further comprising:

a camera arranged to capture image data, the image data to be used for determination of the left eye position or the right eye position.

20. One or more non-transitory computer-readable media (NTCRM) comprising instructions, wherein execution of the instructions is to cause a computing device to:

determine operational parameters of a vehicle;

control display of at least one virtual graphic at a first focal distance based at least in part on the operational parameters of the vehicle, wherein, to control display of the at least one virtual graphic at the first focal distance based at least in part on the operational parameters, execution of the instructions is to cause the computing device to:

control a projection device to generate a light representative of the at least one virtual graphic, control an imaging matrix to modulate the light for projection on at least one image plane, control a display device to display the at least one virtual graphic from the modulated light on the at least one image plane, control a translation device to change a distance between the imaging matrix and the display device to be the first focal distance, and control the translation device to change an angle of incline of the imaging matrix;

determine updated operational parameters of the vehicle; and control display of the at least one virtual graphic at a second focal distance based at least in part on the updated operational parameters of the vehicle, wherein, to control display of the at least one virtual graphic at the second focal distance based at least in part on the updated operational parameter, execution of the instructions is to cause the computing device to:

control the translation device to dynamically change the distance between the imaging matrix and the display device to be the second focal distance, wherein an upper portion of the at least one image plane is associated with the second focal distance different from the first focal distance.

21. The one or more NTCRSM of claim 20, wherein execution of the instructions is to cause the computing device to:

control display of auxiliary information at a third focal distance concurrently with the display of the at least one virtual graphic, wherein, to control display of the auxiliary information at the third focal distance, execution of the instructions is to cause the computing device to:

control the translation device or another translation device to dynamically change a position of the imaging matrix or another imaging matrix relative to the display device based at least in part on the updated operational parameters.

* * * * *